United States Patent
Peregoy

(10) Patent No.: US 9,282,719 B2
(45) Date of Patent: Mar. 15, 2016

(54) COVERING FOR A PET CRATE

(76) Inventor: Sandra M. Peregoy, Middle River, MD (US)

( * ) Notice: Subject to any disclaimer, the term of this patent is extended or adjusted under 35 U.S.C. 154(b) by 0 days.

(21) Appl. No.: 12/788,238

(22) Filed: May 26, 2010

(65) Prior Publication Data

US 2011/0290193 A1 Dec. 1, 2011

(51) Int. Cl.
- *A01K 1/03* (2006.01)
- *A01K 1/035* (2006.01)
- *A01K 31/06* (2006.01)

(52) U.S. Cl.
CPC .................. *A01K 1/035* (2013.01); *A01K 1/033* (2013.01); *A01K 1/034* (2013.01); *A01K 31/06* (2013.01)

(58) Field of Classification Search
CPC ....... A01K 31/04; A01K 31/06; A01K 1/035; A01K 1/0157
USPC ......... 119/469–471, 480, 161, 165, 168, 432, 119/433, 473, 479
See application file for complete search history.

(56) References Cited

U.S. PATENT DOCUMENTS

| | | | | |
|---|---|---|---|---|
| 543,345 A * | 7/1895 | Maxwell et al. | ............... | 119/469 |
| 1,094,423 A * | 4/1914 | Brandt | ........................... | 119/469 |
| 2,002,925 A * | 5/1935 | Robison | ......................... | 119/470 |
| 2,475,515 A * | 7/1949 | Potter | ............................ | 135/125 |
| 3,960,161 A * | 6/1976 | Norman | ......................... | 135/126 |
| 3,970,096 A * | 7/1976 | Nicolai | ............................ | 135/94 |
| 4,023,530 A * | 5/1977 | Cobb | ............................ | 119/480 |
| 4,991,544 A * | 2/1991 | Galvin et al. | .................. | 119/469 |
| 5,088,445 A * | 2/1992 | Brindamour | .................... | 119/469 |
| 5,099,866 A * | 3/1992 | Solis et al. | ...................... | 135/154 |
| 5,136,981 A * | 8/1992 | Barreto et al. | ............... | 119/28.5 |
| 5,311,813 A * | 5/1994 | Fairbanks et al. | ............... | 99/645 |
| 5,626,098 A | 5/1997 | Askins et al. | | |
| 6,155,206 A * | 12/2000 | Godshaw | ........................ | 119/453 |
| 6,263,894 B1* | 7/2001 | LaMantia | ......................... | 135/96 |
| 6,269,775 B1* | 8/2001 | Watts | ............................. | 119/469 |
| 6,394,034 B2* | 5/2002 | Watts | ............................. | 119/469 |
| 6,460,486 B1 | 10/2002 | Powers et al. | | |
| 6,581,545 B1* | 6/2003 | Foster | ............................ | 119/482 |
| 8,336,497 B2* | 12/2012 | van Zuilekom | ............... | 119/169 |
| 2003/0127060 A1* | 7/2003 | Yeung | ............................ | 119/497 |

OTHER PUBLICATIONS

Frontgate, Luxury Pet Residence, available at http://www.frontgate.com/mercadoSearch.do?action=search&newSearch=true&freeText=37312 (last acessed Jul. 27, 2010).

\* cited by examiner

*Primary Examiner* — Rob Swiatek
*Assistant Examiner* — Danielle Clerkley
(74) *Attorney, Agent, or Firm* — Stamoulis & Weinblatt LLC

(57) ABSTRACT

A covering for an animal crate is described. In accordance with one implementation, a covering is configured to prevent an amount of an animal's hair, dirt, or mess created by the animal from escaping through at least one aperture located on a lower portion of a wall of a crate. The covering comprises a panel operably attached to the lower portion of the wall of the crate. The panel is of a length and height sufficient to prevent an amount of the animal's hair, dirt, or mess created by the animal from escaping through the at least one aperture located on the lower portion of the wall of the crate.

20 Claims, 3 Drawing Sheets

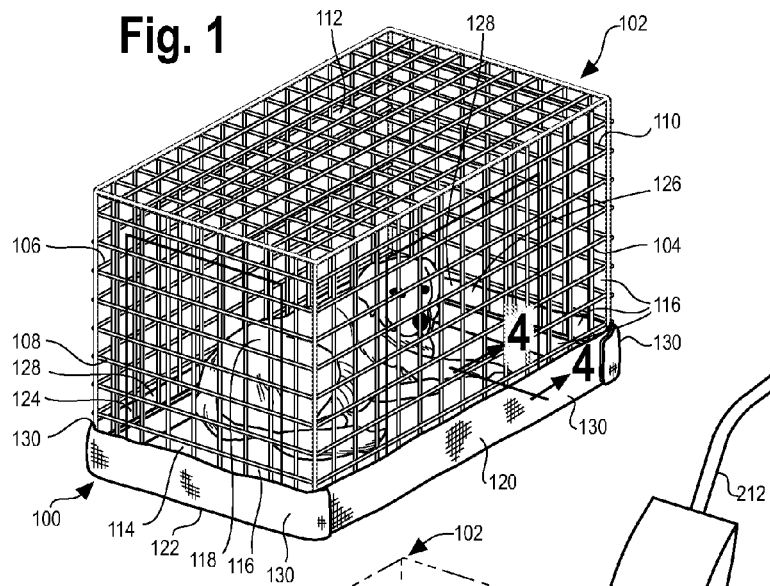
Fig. 1
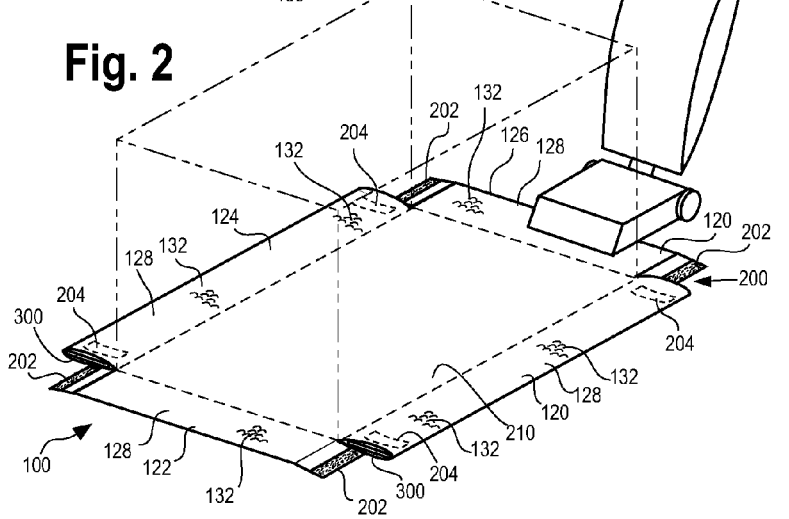
Fig. 2
Fig. 4
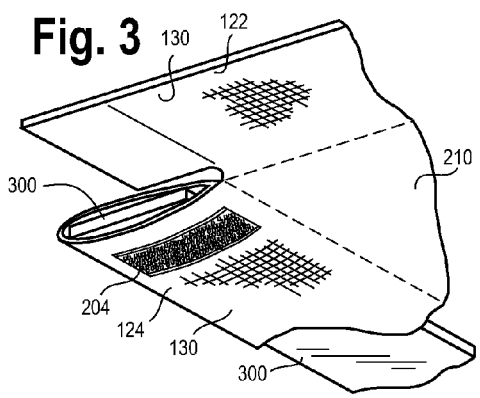
Fig. 3

US 9,282,719 B2

COVERING FOR A PET CRATE

TECHNICAL FIELD

This application relates in general to animal crates.

BACKGROUND

Many pet owners crate train their pets. As explained in U.S. Pat. No. 5,626,098, dog crates generally provide a safe, secure environment for housetraining, travel, and general control. In time, a crate often becomes the dog's den, which is presumed to utilize the dog's natural instincts as a den animal. Other pets, including, but not limited to, cats and rabbits also may be crate trained. In addition, pets such as rodents may be kept in a cage that may be designed similar to a crate.

Crates, often referred to as "kennels," may come in different shapes and sizes and may be made out of different materials. Two non-limiting examples of material that may be used to make crates are plastic and metal. Plastic crates generally are molded two-piece units with ventilation areas along the sides and a metal wire door in front. Some metal crates are made of wires that form a grid-like pattern for the walls of the crates.

If the pet inside the crate sheds or is messy, hair and/or "dirt" may exit the crate through the apertures. Depending on how much hair and/or dirt exits the crate, the pet's owner may have to clean the hair and/or dirt off the floor several times a week.

SUMMARY

This application describes a covering for a pet crate.

In accordance with one implementation, a covering is configured to prevent an amount of an animal's hair, dirt, or mess created by the animal from escaping through at least one aperture located on a lower portion of a wall of a crate. The covering comprises a panel operably attached to the lower portion of the wall of the crate. The panel is of a length and height sufficient to prevent an amount of the animal's hair, dirt, or mess created by the animal from escaping through the at least one aperture located on the lower portion of the wall of the crate.

In accordance with another implementation, a covering is configured to prevent an amount of an animal's hair, dirt, or mess created by the animal from escaping through at least one lower portion of a crate having a plurality of walls, and the lower portion of at least one of the walls has at least one aperture. The covering comprises a panel operably attached to each lower wall of a plurality of the walls of the crate. Each panel is of a height sufficient to prevent an amount of the animal's hair, dirt, or mess created by the animal from escaping through the lower portion of the wall of the crate to which the panel is operably attached.

The details of one or more implementations are set forth in the accompanying drawings and the description below. Other features, aspects, and advantages will become apparent from the description, the drawings, and the claims. It is to be understood that the foregoing general description and the detailed description are exemplary, but not restrictive of the covering or the method for making the covering.

DESCRIPTION OF DRAWINGS

In the drawings, which are discussed below, one or more implementations are illustrated. It is understood that the covering for a pet crate is not limited to the implementations depicted in the drawings herein, but rather it is defined by the claims appended hereto and equivalent structures.

FIG. 1 is a front perspective view of an exemplary implementation of the covering for a pet crate.

FIG. 2 is a front perspective view of the covering for a pet crate of FIG. 1.

FIG. 3 is a cutaway bottom perspective view of the covering for a pet crate of FIG. 1.

FIG. 4 is a cross-section of the covering for a pet crate of FIG. 1.

Like reference symbols in the various drawings indicate like elements.

DETAILED DESCRIPTION

Figure 5:
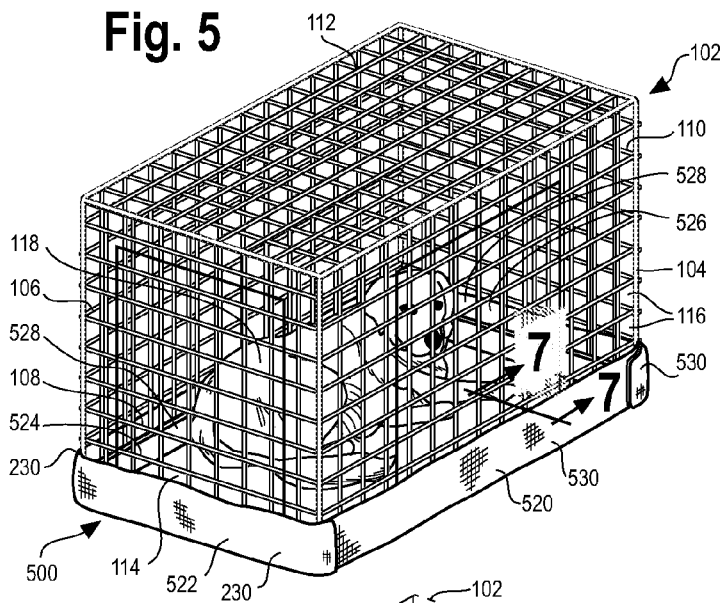
FIG. 5 is a front perspective view of another exemplary implementation of the covering for a pet crate.

While the specification concludes with claims particularly pointing out and distinctly claiming subject matter, the covering will now be further described by reference to the following detailed description of exemplary implementations taken in conjunction with the above-described accompanying drawings. The following description is presented to enable any person skilled in the art to make and use the covering for a pet crate. Descriptions of specific implementations and applications are provided only as non-limiting examples and various modifications will be readily apparent to those skilled in the art. The general principles defined herein may be applied to other implementations and applications without departing from the spirit and scope of the covering for a pet crate. Thus, the covering for a pet crate is to be accorded the widest scope encompassing numerous alternatives, modifications, and equivalents consistent with the principles and features disclosed herein. For purpose of clarity, details relating to technical material that is known in the technical fields related to the covering for a pet crate have not been described in detail so as not to unnecessarily obscure the present application.

FIG. 1 shows an exemplary implementation of a covering 100 that may be used with an animal crate 102. In some implementations, the crate 102 may have at least two generally parallel side walls 104, 106, at least two generally parallel end walls 108, 110, and a top wall 112 operably attached to the side walls 104, 106 and end walls 108, 110. An optional base 114 may be operably attached to the bottom of the side walls 104, 106 and end walls 108, 110. In some implementations, the optional base 114 may be removable. In some implementations, a tray may lay on top of the base 114. In some implementations, as shown in FIG. 4, a tray may be the base 114. In some implementations, the crate 102 may have at least one "door" for the animal to enter and exit the crate 102.

As shown in FIG. 1, the walls 104, 106, 108, 110, 112 may have apertures 116 for ventilation. In some implementations, the walls 104, 106, 108, 110, 112 are each formed of grids with parallel rods. In some implementations, not all of the walls 104, 106, 108, 110, 112 are formed of grids with parallel rods. In some implementations, at least one of the walls has at least one aperture 116 for ventilation. When an animal, including, but not limited to a dog 118, that sheds hair or is messy is inside the crate 102, hair and/or dirt may exit the crate 102 through the apertures 116 located on the bottom side and end walls 104, 106, 108, 110 of the crate 102. As used in this disclosure, the term "hair" encompasses both hair and fur.

The covering 100 may be configured to prevent an amount of the animal's hair or dirt from escaping through apertures 116 located on the lower portions of the side and end walls 104, 106, 108, 110 of the crate 102. As shown in FIGS. 1 and 2, the covering 100 may have panels 120, 122, 124, 126. The panels 120, 122, 124, 126 have an inner portion 128 and an outer portion 130. The inner portion 128 faces the inside of the crate 102 and the outer portion 130 faces outside of the crate 102. The panels 120, 122, 124, 126 are of length and height sufficient to prevent an amount of the animal's hair 132 from escaping through the apertures 116 found in the lower portions of the walls 104, 106, 108, 110 of the crate 102.

In some implementations, the inner portion 128 and the outer portion 130 of the panels 120, 122, 124, 126 may be made of the same material. In some implementations, the inner portion 128 and the outer portion 130 of the panels 120, 122, 124, 126 may be made of different materials. In some implementations, the material used for the inner portion 128 of the panels 120, 122, 124, 126 is sufficient to permit an amount of hair 132 to "stick" to the material. In some implementations, the materials used for the panels 120, 122, 124, 126 may be man-made or natural materials or fabrics. In some implementations, the panels 120, 122, 124, 126 may be made of fleece, felt, a cotton-based fabric, a polyester-based fabric, a material made of an olefin, plastic, or a combination of the foregoing. In some implementations, the inner portion 128 of the panels 120, 122, 124, 126 may be fleece and the outer portion 130 may be denim. In some implementations, the panels 120, 122, 124, 126 may be made of a substantially rigid material. In some implementations, the material for the inner portion 128 and the material for the outer portion 130 are attached to each other by stitching, heat seal, zipper, a hook and loop fastener, a button, or any other suitable mechanism known by one of ordinary skill in the art for connecting the inner and outer portions 128, 130 together.

In some implementations, the length of each panel 120, 122, 124, 126 is substantially the length of the wall to which it is operably attached. Referring to FIG. 1, the length of panel 120 may be substantially the same length as side wall 104, the length of panel 122 may be substantially the same length as end wall 108, the length of panel 124 may be substantially the same length as side wall 106, and the length of panel 126 may be substantially the same length as end wall 110. In some implementations, the panel 120, 122, 124, 126 may be longer than the length of its corresponding side or end wall 104, 106, 108, 110. In some implementations, the panel 120, 122, 124, 126 may be shorter than the length of its corresponding side or end wall 104, 106, 108, 110.

In some implementations, the height of the panels 120, 122, 124, 126 is sufficient to permit the animal inside the crate 102 to see out and contain an amount of the hair 132 shed from the animal, dirt, or the mess created by the animal from escaping through apertures 116 found in the lower portions of the walls 104, 106, 108, 110 of the crate 102. In some implementations, the height of the panels 120, 122, 124, 126 is about 5% to about 75% of the height of the wall to which the panel is operably attached. In some implementations, the height of the panels 120, 122, 124, 126 is about 25% of the height of the wall to which the panel is operably attached. In some implementations, the height of the panels 120, 122, 124, 126 is about 10%-15% of the height of the wall to which the panel is operably attached. In some implementations, the height of the panels 120, 122, 124, 126 is about 2 inches to about 8 inches. In some implementations, the height of the panels 120, 122, 124, 126 is about 6 inches to about 8 inches. In some implementations, the height of the panels 120, 122, 124, 126 is about 8 inches.

In some implementations, a mechanism 200 for operably attaching the cover 100 to the crate 102 may be present. As shown in FIG. 2, the mechanism 200 may be a hook and loop fastener. In FIG. 2, hooks 202 are positioned on one panel and correspond to mating loops 204 on another panel. As a non-limiting example, panel 120 may be operably connected to panels 120 and 128 via corresponding hook and loop fasteners 202, 204. In some implementations, the mechanism 200 may be found within one panel. As a non-limiting example, a panel may have a hook and loop fastener on it so that an end of the panel may have hooks on one side and loops on the opposite side so that when it is wrapped around the wall of the crate, it may be operably attached to the opposite side of the panel via corresponding loops. In some implementations, the mechanism 200 may be a snap-lock mechanism, a press-fit mechanism, a slide-and-lock mechanism, a twist-and-lock or other friction-fit mechanism, a tongue-and-groove mechanism, a buckle mechanism, a button mechanism, string, rope, laces, magnets, a zipper, an elastic band, clip, hook, or any other suitable mechanism for securing the cover 100 to the crate 102.

In some implementations, as shown in FIG. 2, the panels 120, 122, 124, 126 may be connected to each other via material 206. When material 206 connects the panels 120, 122, 124, 126, the crate 102 may rest on top of material 206 and the panels 120, 122, 124, 126 may be raised and lowered as shown in FIGS. 1 and 2, respectively. In some implementations, the panels 120, 122, 124, 126 may be lowered so that the inner portions 128 of the panels 120, 122, 124, 126 may be cleaned. In some implementations, the weight of the crate 102 may prevent the panels 120, 122, 124, 126 from significantly moving when a vacuum 212 is used to clean the inner portions 128 of the panels 120, 122, 124, 126. In some implementations having panels 120, 122, 124, 126 made of a rigid or substantially rigid material, a mechanism for raising or lowering the panels 120, 122, 124, 126 may be present. In some implementations, the mechanism for raising or lowering the panels 120, 122, 124, 126 may be a hinge, elastic, a joint, or any other mechanism for raising or lowering the panels 120, 122, 124, 126.

In some implementations, the panel may be a sleeve. In some implementations, an insert 300 may be located within the sleeve. In some implementations, the insert 300 may be a rigid or semi-rigid material. As shown in FIG. 4, the panel 124 has an insert 300 of a rigid or semi-rigid material located within the inner portion 128 and outer portion 130 of the panel 124. In some implementations having an insert 300 located within the panel, the insert 300 may prevent or substantially prevent the panel from sagging. The rigid or semi-rigid material may be a natural or man-made material. Non-limiting examples of materials that may be used for the insert 300 are plastic, Plexiglas, glass, metal, rubber, fiberglass, cardboard, any other material suitable for the purposes described herein, or combinations of these materials.

Figure 6:
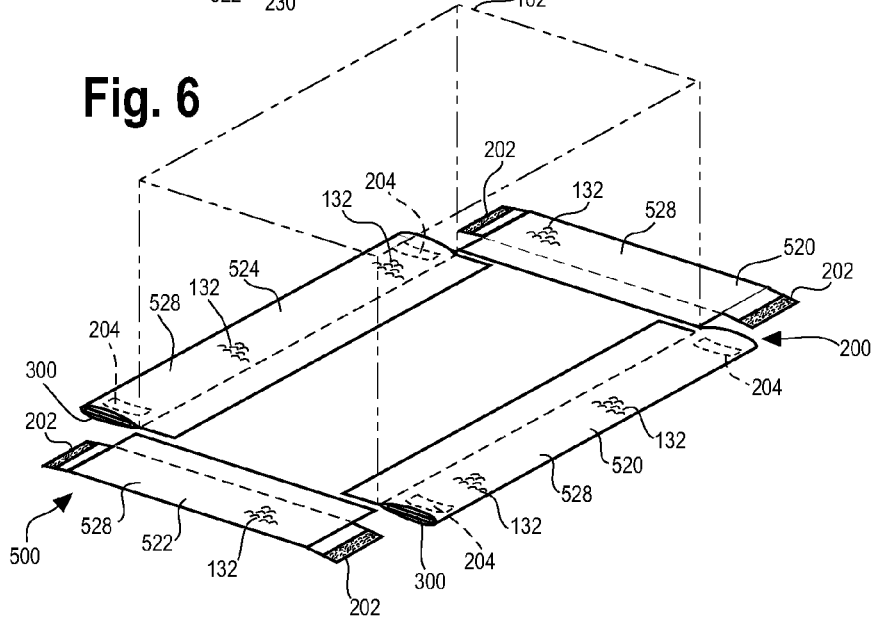
FIG. 6 is a bottom a front perspective view of the covering for a pet crate of FIG. 5.

FIG. 5 shows another implementation of the covering. The covering 500 may be configured to prevent an amount of the animal's hair or dirt from escaping through apertures 116 located on the lower portions of the side and end walls 104, 106, 108, 110 of the crate 102. As shown in FIGS. 5 and 6, the covering 200 may have panels 520, 522, 524, 526. The panels 520, 522, 524, 526 have an inner portion 528 and an outer portion 530. The inner portion 528 faces the inside of the crate 102 and the outer portion 530 faces outside of the crate 102.

The panels 520, 522, 524, 526 are of length and height sufficient to prevent an amount of the animal's hair 132 from escaping through the apertures 116 found in the lower portions of the walls 104, 106, 108, 110 of the crate 102.

In some implementations, the inner portion 528 and the outer portion 530 of the panels 520, 522, 524, 526 may be made of the same material. In some implementations, the inner portion 128 and the outer portion 530 of the panels 520, 522, 524, 526 may be made of different materials. In some implementations, the material used for the inner portion 528 of the panels 520, 522, 524, 526 is sufficient to permit an amount of hair 132 to "stick" to the material. In some implementations, the materials used for the panels 520, 522, 524, 526 may be man-made or natural materials or fabrics. In some implementations, the panels 520, 522, 524, 526 may be made of fleece, felt, a cotton-based fabric, a polyester-based fabric, a material made of an olefin, plastic, or a combination of the foregoing. In some implementations, the inner portion 528 of the panels 520, 522, 524, 526 may be fleece and the outer portion 530 may be denim. In some implementations, the panels 520, 522, 524, 526 may be made of a substantially rigid material. In some implementations, the material for the inner portion 528 and the material for the outer portion 530 are attached to each other by stitching, heat seal, zipper, a hook and loop fastener, a button, or any other suitable mechanism known by one of ordinary skill in the art for connecting the inner and outer portions 528, 530 together.

In some implementations, the length of each panel 520, 522, 524, 526 is substantially the length of the wall to which it is operably attached. Referring to FIG. 5, the length of panel 520 may be substantially the same length as side wall 104, the length of panel 522 may be substantially the same length as end wall 108, the length of panel 524 may be substantially the same length as side wall 106, and the length of panel 526 may be substantially the same length as end wall 110. In some implementations, the panel 520, 522, 524, 526 may be longer than the length of its corresponding side or end wall 504, 506, 508, 510. In some implementations, the panel 520, 522, 524, 526 may be shorter than the length of its corresponding side or end wall 104, 106, 108, 110.

In some implementations, the height of the panels 520, 522, 524, 526 is sufficient to permit the animal inside the crate 102 to see out of the crate 102 and contain an amount of the hair 132 shed from the animal, dirt, or the mess created by the animal from escaping through apertures 116 found in the lower portions of the walls 104, 106, 108, 110 of the crate 102. In some implementations, the height of the panels 520, 522, 524, 526 is about 5% to about 75% of the height of the wall to which the panel is operably attached. In some implementations, the height of the panels 520, 522, 524, 526 is about 25% of the height of the wall to which the panel is operably attached. In some implementations, the height of the panels 520, 522, 524, 526 is about 10%-15% of the height of the wall to which the panel is operably attached. In some implementations, the height of the panels 520, 522, 524, 526 is about 2 inches to about 8 inches. In some implementations, the height of the panels 520, 522, 524, 526 is about 6 inches to about 8 inches. In some implementations, the height of the panels 520, 522, 524, 526 is about 8 inches.

In some implementations, as shown in FIG. 6, the panels 520, 522, 524, 526 may extend under a portion of the crate 102. In some implementations, the panels 520, 522, 524, 526 may be raised and lowered as shown in FIGS. 5 and 6, respectively. In some implementations, the panels 520, 522, 524, 526 may be lowered so that the inner portions 528 of the panels 520, 522, 524, 526 may be cleaned. In some implementations having panels 520, 522, 524, 526 of sufficient dimensions so that the crate 102 may rest on a portion of the panels 520, 522, 524, 526, the weight of the crate 102 may prevent the panels 520, 522, 524, 526 from significantly moving when a vacuum is used to clean the inner portions 528 of the panels 520, 522, 524, 526. In some implementations having panels 520, 522, 524, 526 made of a rigid or substantially rigid material, a mechanism for raising or lowering the panels 520, 522, 524, 526 may be present. In some implementations, the mechanism for raising or lowering the panels 520, 522, 524, 526 may be a hinge, elastic, a joint, or any other mechanism for raising or lowering the panels 520, 522, 524, 526.

Figure 7:
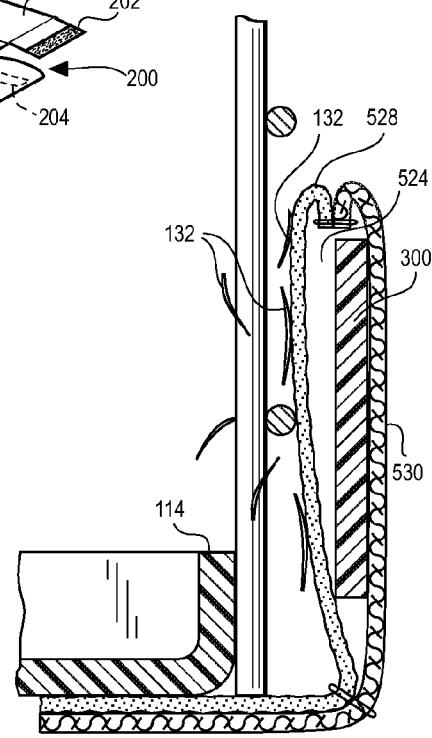
FIG. 7 is a cross-section of the covering for a pet crate of FIG. 5.

In some implementations, the panel may be a sleeve. In some implementations, an insert 300 may be located within the sleeve. In some implementations, the insert 300 may be a rigid or semi-rigid material. As shown in FIG. 7, the panel 524 has an insert 300 made of a rigid or semi-rigid material located within the inner portion 528 and outer portion 530 of the panel 524. In some implementations having an insert 300 located within the panel, the insert 300 may prevent or substantially prevent the panel from sagging.

Figure 8:
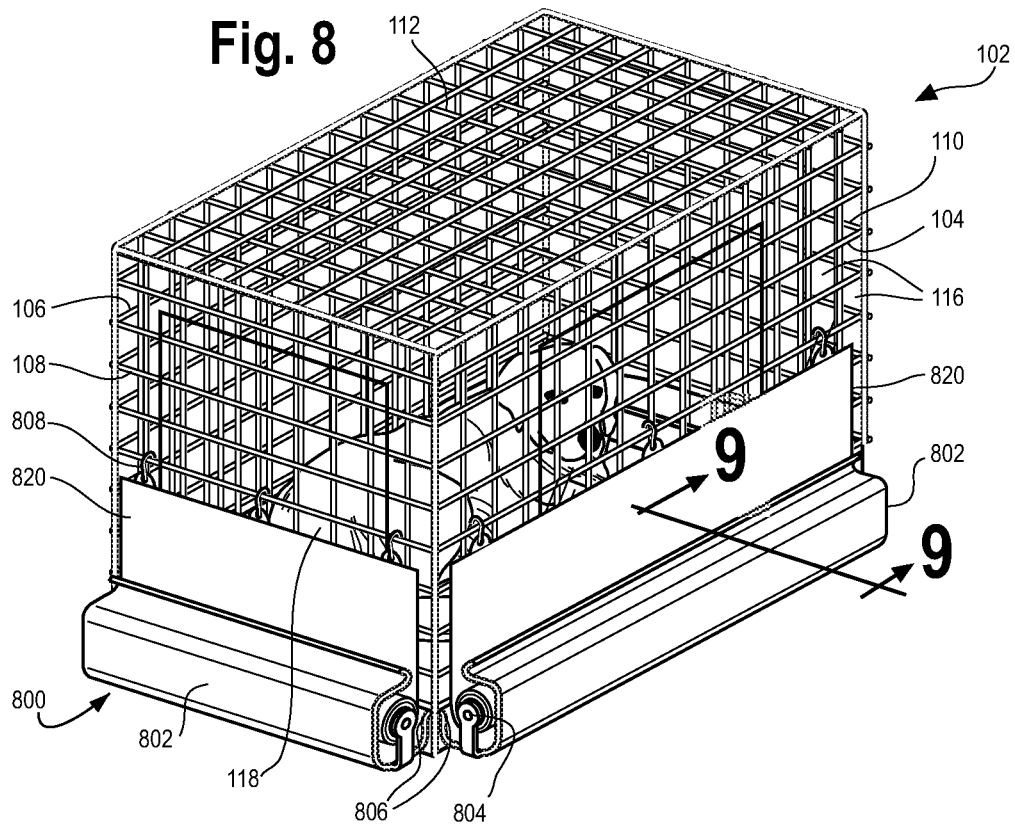
FIG. 8 is a front perspective view of yet another exemplary implementation of the covering for a pet crate.

Another implementation of the covering is shown in FIG. 8. The covering 800 may be configured to prevent an amount of the animal's hair or dirt from escaping through apertures 116 located on the bottom side and end walls 104, 106, 108, 110 of the crate 102. In some implementations, the covering 800 has a panel 820 that is stored within a housing 802. In some implementations, the housing 802 is substantially the length of the wall 104, 106, 108, 110 of the crate 102 to which it is operably attached.

Figure 9:
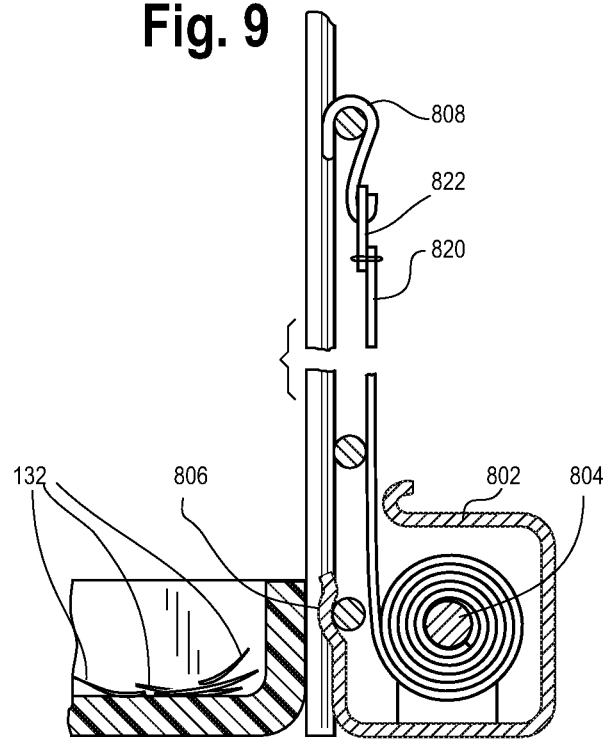
FIG. 9 is a cross-section of the covering for a pet crate of FIG. 8.

As shown in FIG. 8, a housing 802 may be operably connected to wall 104 and a housing 802 is operably connected to wall 106. In some implementations, the housing 802 may be operably connected to a wall 104, 106, 108, 110 of the crate 102 via a mechanism 806 such as a latch as shown in FIG. 9. In some implementations, mechanism 806 may be a hook, a hook and loop fastener, a snap-lock mechanism, a press-fit mechanism, a slide-and-lock mechanism, a twist-and-lock or other friction-fit mechanism, a tongue-and-groove mechanism, a buckle mechanism, a button mechanism, string, rope, laces, or any other suitable mechanism for securing the housing 802 to the crate 102. In some implementations, the housing 802 may be detachably connected to the crate 102. In some implementations, the housing 802 is not operably connected to the housing. In some implementations, the housing 802 rests adjacent to a wall 104, 106, 108, 110 of the crate.

In some implementations, a roller 804 may be located within the housing 802 and the roller 804 may be operably connected to the housing 802. In some implementations, the panel 820 is "rolled" or "wrapped" around the roller 804, and one end of the panel 820 may be operably attached to the roller 804. In some implementations, the panel 820 may be unrolled from around the roller 804 to extend a distance up the corresponding wall 104, 106, 108, 110 of the crate 102 to which the housing 802 is located. In some implementations, the panel 820 is configured to extend a length and height sufficient to prevent an amount of the animal's hair 132, dirt, or the mess created by the animal from escaping through the apertures 116 found in the lower portion of the wall 104, 106, 108, 110 of the crate 102 to which it is operably attached.

In some implementations, a mechanism 808 for attaching the panel 820 to the wall 104, 106, 108, 110 to which it is operably connected may be present. The mechanism 808 may be a hook (as shown in FIGS. 8 and 9), a hook and loop fastener, a snap-lock mechanism, a press-fit mechanism, a slide-and-lock mechanism, a twist-and-lock or other friction-fit mechanism, a tongue-and-groove mechanism, a buckle mechanism, a button mechanism, string, rope, laces, magnets, an elastic band, clip or any other any other suitable mechanism for connecting the panel 820 to its associated wall 104, 106, 108, 110 of the crate 102. In some implementations, the mechanism 808 may be located on or connected to the panel 820. In some implementations, the mechanism 808 may be located on at least one wall of the crate 102. In some implementations, the mechanism 808 may be located on the panel 820 and the wall of the crate 102 to which the panel 820 is to be operably connected. In some implementations, the mechanism 808 may be attached to a separate piece of material 822 that is operably connected to the panel 820 as shown in FIG. 9. The material 822 may be the same or different type of material that is used for the panel 820.

In some implementations, the height of the panel 820 is sufficient to permit the animal inside the crate 102 to see out and contain an amount of the hair 132 shed from the animal, dirt, or the mess created by the animal from escaping through apertures 116 found in the lower portion of the wall 104, 106, 108, 110 of the crate 102 to which the panel 108 is operably attached. In some implementations, the height of the panel 820 is about 5% to about 75% of the height of the wall to which the panel is operably attached. In some implementations, the height of the panel 820 is about 25% of the height of the wall to which the panel is operably attached. In some implementations, the height of the panel 820 is about 10% to about 15% of the height of the wall to which the panel is operably attached. In some implementations, the height of the panels 820 is about 2 inches to about 8 inches. In some implementations, the height of the panels 820 is about 6 inches to about 8 inches. In some implementations, the height of the panels 820 is about 8 inches.

In some implementations, the panel 820 is made of fleece, felt, a cotton-based fabric, a polyester-based fabric, a material made of an olefin, plastic, a solar fabric, or a combination of the foregoing. In some implementations, the panel 820 is made of solar fabric so that the animal 118 inside the crate 102 may see outside of the crate 102 through the panel 820.

A number of implementations have been described. Nevertheless, it will be understood that various modifications may be made without departing from the spirit and scope of the disclosures in this application. As a non-limiting example, additional components may be added to those described above, or components may be removed or rearranged. It is understood by one skilled in the art that the connections and attachments described in this disclosure may be direct or indirect connections and attachments, respectively.

As another non-limiting example, a mechanism to prevent or substantially prevent the panel 120, 122, 124, 126, 820 from sagging may be present. The mechanism to prevent or substantially prevent the panel from sagging may be a button mechanism, string, rope, laces, hook, clip, magnets, a zipper, an elastic band, or any other suitable mechanism for preventing or substantially preventing the panel 120, 122, 124, 126, 820 from sagging.

Other implementations are within the scope of the following claims.

What is claimed is:

1. A covering to prevent one of an amount of an animal's hair, dirt, and mess created by the animal from escaping through an aperture of an animal crate, the covering comprising: at least four side panels, each side panel configured to extend upward along the lower portion of a sidewall of the animal crate, such that each side panel extends less than a total height of the sidewall of the crate; a base panel configured to extend underneath a base of the animal crate; each side panel directly attached along its length to an outer edge of the base panel, such that the at least four side panels define substantially a perimeter of the base panel; each side panel being movable between a substantially parallel position and a substantially perpendicular position relative to the base panel; the covering includes an inner surface material configured to permit one of an amount of an animal's hair, dirt, and mess created by the animal to stick to the covering and an outer surface material; wherein the inner surface material is attached to the outer surface material to define a sleeve; and a releasable fastener disposed on terminal ends of each side panel for securing each side panel to an adjacent side panel.

2. The covering of claim 1, wherein each side panel is about 5% to 75% of the total height of a respective sidewall.

3. The covering of claim 1, further comprising an insert located within each sleeve.

4. The covering of claim 3, wherein the insert comprises plastic.

5. The covering of claim 1, wherein the inner surface material is configured to directly contact the outside of the crate in the substantially perpendicular position.

6. The covering of claim 1, wherein each side panel includes the inner surface material made of a different material than the outer surface material.

7. The covering of claim 1, wherein each side panel is made from one of: man-made materials, natural materials, and natural fabrics.

8. The covering of claim 1, wherein at least one side panel is configured to be connected to a sidewall of the crate.

9. The covering of claim 1, wherein the releasable fastener comprises at least one item selected from the group consisting of: a hook and loop fastener, a snap-lock mechanism, a press-fit mechanism, a slide-and-lock mechanism, a twist-and-lock or other friction-fit mechanism, a tongue-and-groove mechanism, a buckle mechanism, a button mechanism, string, rope, laces, magnets, a zipper, an elastic band, a clip, Velcro, and a hook.

10. The covering of claim 1, wherein each side panel is made from one of: fleece, felt, a cotton-based fabric, a polyester-based fabric, an olefin material, and a plastic material.

11. A system including an animal crate and a covering configured for use with the crate to prevent one of an amount of an animal's hair, dirt, and mess created by the animal from escaping through an aperture of the crate, the covering comprising: at least four side panels, each side panel configured to extend upward along the lower portion of a sidewall of the animal crate, such that each side panel extends less than a total height of the sidewall of the crate; a base panel configured to extend underneath a base of the animal crate; each side panel directly attached along its length to an outer edge of the base panel, such that the at least four side panels define substantially a perimeter of the base panel; each side panel being movable between a substantially parallel position and a substantially perpendicular position relative to the base panel; the covering includes an inner surface material configured to permit one of an amount of an animal's hair, dirt, and mess created by the animal to stick to the covering and an outer surface material; wherein the inner surface material is attached to the outer surface material to define a sleeve; and a releasable fastener disposed on terminal ends of each side panel for securing each side panel to an adjacent side panel.

12. The covering of claim 11, wherein each side panel is about 5% to 75% of the total height of a respective sidewall.

13. The covering of claim 11, further comprising an insert located within each sleeve.

14. The covering of claim 13, wherein the insert comprises plastic.

15. The covering of claim 11, wherein the inner surface material is configured to directly contact the outside of the crate in the substantially perpendicular position.

16. The covering of claim 11, wherein each side panel includes the inner surface material made of a different material than the outer surface material.

17. The covering of claim 11, wherein each side panel is made from one of: man-made materials, natural materials, and natural fabrics.

18. The covering of claim 11, wherein at least one side panel is configured to be connected to a sidewall of the crate.

19. The covering of claim 11, wherein the releasable fastener comprises at least one item selected from the group consisting of: a hook and loop fastener, a snap-lock mechanism, a press-fit mechanism, a slide-and-lock mechanism, a twist-and-lock or other friction-fit mechanism, a tongue-and-groove mechanism, a buckle mechanism, a button mechanism, string, rope, laces, magnets, a zipper, an elastic band, a clip, Velcro, and a hook.

20. The covering of claim 11, wherein each side panel is made from one of: fleece, felt, a cotton-based fabric, a polyester-based fabric, an olefin material, and a plastic material.

\* \* \* \* \*